(12) United States Patent
Jorgenson et al.

(10) Patent No.: US 7,730,334 B2
(45) Date of Patent: Jun. 1, 2010

(54) METHOD AND APPARATUS FOR ON-DEMAND POWER MANAGEMENT

(75) Inventors: Joel A. Jorgenson, Fargo, ND (US); Divyata Kakumanu, Moorhead, MN (US); Brian M. Morlock, Fargo, ND (US)

(73) Assignee: Packet Digital, Fargo, ND (US)

( * ) Notice: Subject to any disclaimer, the term of this patent is extended or adjusted under 35 U.S.C. 154(b) by 0 days.

(21) Appl. No.: 12/004,593

(22) Filed: Dec. 20, 2007

(65) Prior Publication Data

US 2008/0133943 A1 Jun. 5, 2008

Related U.S. Application Data

(62) Division of application No. 11/019,804, filed on Dec. 21, 2004, now Pat. No. 7,337,335.

(51) Int. Cl.
G06F 1/00 (2006.01)
H03L 7/00 (2006.01)
H02H 3/22 (2006.01)

(52) U.S. Cl. .................. 713/300; 713/330; 327/143; 361/111

(58) Field of Classification Search .............. 713/300, 713/330; 327/143; 361/111
See application file for complete search history.

(56) References Cited

U.S. PATENT DOCUMENTS

| | | | |
|---|---|---|---|
| 5,745,375 A | 4/1998 | Reinhardt et al. | |
| 6,073,244 A | 6/2000 | Iwazaki | |
| 6,333,650 B1 * | 12/2001 | Amin et al. | 327/143 |
| 6,348,780 B1 | 2/2002 | Grant | |
| 6,484,041 B1 | 11/2002 | Aho et al. | |
| 6,548,991 B1 | 4/2003 | Maksimovic et al. | |
| 6,574,739 B1 * | 6/2003 | Kung et al. | 713/322 |
| 6,608,528 B2 * | 8/2003 | Tam et al. | 331/2 |
| 6,754,837 B1 | 6/2004 | Helms | |
| 6,762,629 B2 | 7/2004 | Tam et al. | |
| 6,778,418 B2 | 8/2004 | Meguro | |
| 6,788,156 B2 | 9/2004 | Tam et al. | |
| 6,795,517 B1 | 9/2004 | Marshall | |
| 6,928,559 B1 * | 8/2005 | Beard | 713/300 |
| 6,973,151 B2 | 12/2005 | Lysdal et al. | |
| 7,013,406 B2 | 3/2006 | Naveh et al. | |
| 7,093,177 B2 | 8/2006 | West et al. | |
| 7,096,373 B2 | 8/2006 | Oh | |
| 7,111,179 B1 | 9/2006 | Girson et al. | |
| 7,278,035 B2 | 10/2007 | Chung et al. | |

(Continued)

OTHER PUBLICATIONS

PCT Written Opinion of the International Searching Authority, PCT/US05/44052 filed Dec. 5, 2005, mailed Apr. 16, 2007. 10 pages.

(Continued)

*Primary Examiner*—Stefan Stoynov
(74) *Attorney, Agent, or Firm*—Blakely, Sokoloff, Taylor & Zafman LLP

(57) ABSTRACT

A method for on-demand power management monitors a processing demand in a processing system operating at a first set of voltages and frequencies and generates a second set of voltages and frequencies in response to the processing demand. The method switches from the first set of voltages and frequencies to the second set of voltages and frequencies without halting the processing system.

21 Claims, 12 Drawing Sheets

U.S. PATENT DOCUMENTS

| | | | |
|---|---|---|---|
| 7,376,854 B2* | 5/2008 | Lehwalder et al. | 713/330 |
| 7,392,411 B2* | 6/2008 | Shakkarwar | 713/320 |
| 2002/0110212 A1 | 8/2002 | Lysdal et al. | |
| 2003/0065960 A1 | 4/2003 | Rusu et al. | |
| 2003/0071657 A1 | 4/2003 | Soerensen et al. | |
| 2003/0076183 A1 | 4/2003 | Tam et al. | |
| 2003/0201838 A1 | 10/2003 | Tam et al. | |
| 2004/0225902 A1 | 11/2004 | Cesare et al. | |
| 2005/0076253 A1 | 4/2005 | Lu | |
| 2005/0138444 A1 | 6/2005 | Gaskins | |

OTHER PUBLICATIONS

International Search Report, International Application PCT/US05/44052, International filing date Dec. 5, 2005, mailed Apr. 16, 2007, 2 pages.

PCT International Preliminary Report on Patentability Chapter I of the Patent Cooperation Treaty), PCT/US2005/044052 filed Dec. 5, 2005, mailed Jul. 5, 2007.

Hartman, Mark, et al., On-Chip Power Management Utilizing An Embedded Hardware Controller and A Low-Power Serial Interface, National Semiconductor Corp., 1820 Lefthand Circle, Longmont, CO, 80501, USA, 10 pages, date unknown.

PCT International Preliminary Report on Patentability (Chapter I of the Patent Cooperation Treaty), PCT/US05/044053 filed Dec. 5, 2005, mailed Jul. 5, 2007, 9 pages.

International Search Report and Written Opinion of the International Searching Authority, PCT/US05/044053 filed Dec. 5, 2005, mailed Mar. 6, 2007, 12 pages.

U.S. Appl. No. 11/020,077, filed Dec. 21, 2004, Notice of Allowance mailed Mar. 28, 2007, 6 pages.

U.S. Appl. No. 11/020,077, filed Dec. 21, 2004, Office Action mailed Nov. 22, 2006, 22 pages.

U.S. Appl. No. 11/784,866, filed Apr. 9, 2007, Notice of Allowance mailed May 12, 2008, 9 pages.

U.S. Appl. No. 11/784,866, filed Apr. 9, 2007, Office Action mailed Jan. 2, 2008, 14 pages.

U.S. Appl. No. 11/784,866, filed Apr. 9, 2007, Office Action mailed Jun. 20, 2007, 16 pages.

U.S. Appl. No. 11/019,804, filed Dec. 21, 2004, Final Office Action mailed Sep. 5, 2007, 22 pages.

U.S. Appl. No. 11/019,804, filed Dec. 21, 2004, Notice of Allowance mailed Nov. 6, 2007, 5 pages.

U.S. Appl. No. 11/019,804, filed, Dec. 21, 2004, Office Action mailed Mar. 26, 2007, 17 pages.

U.S. Appl. No. 11/019,804, filed Dec. 21, 2004, Office Action mailed Nov. 22, 2006, 6 pages.

U.S. Appl. No. 12/004,707, filed Dec. 20, 2007, Office Action mailed Mar. 17, 2009, 13 pages.

U.S. Appl. No. 12/004,707, filed Dec. 20, 2007, Notice of Allowance mailed Dec. 3, 2009, 17 pages.

U.S. Appl. No. 12/004,707, filed Dec. 20, 2007, Final Office Action mailed Sep. 2, 2009, 16 pages.

\* cited by examiner

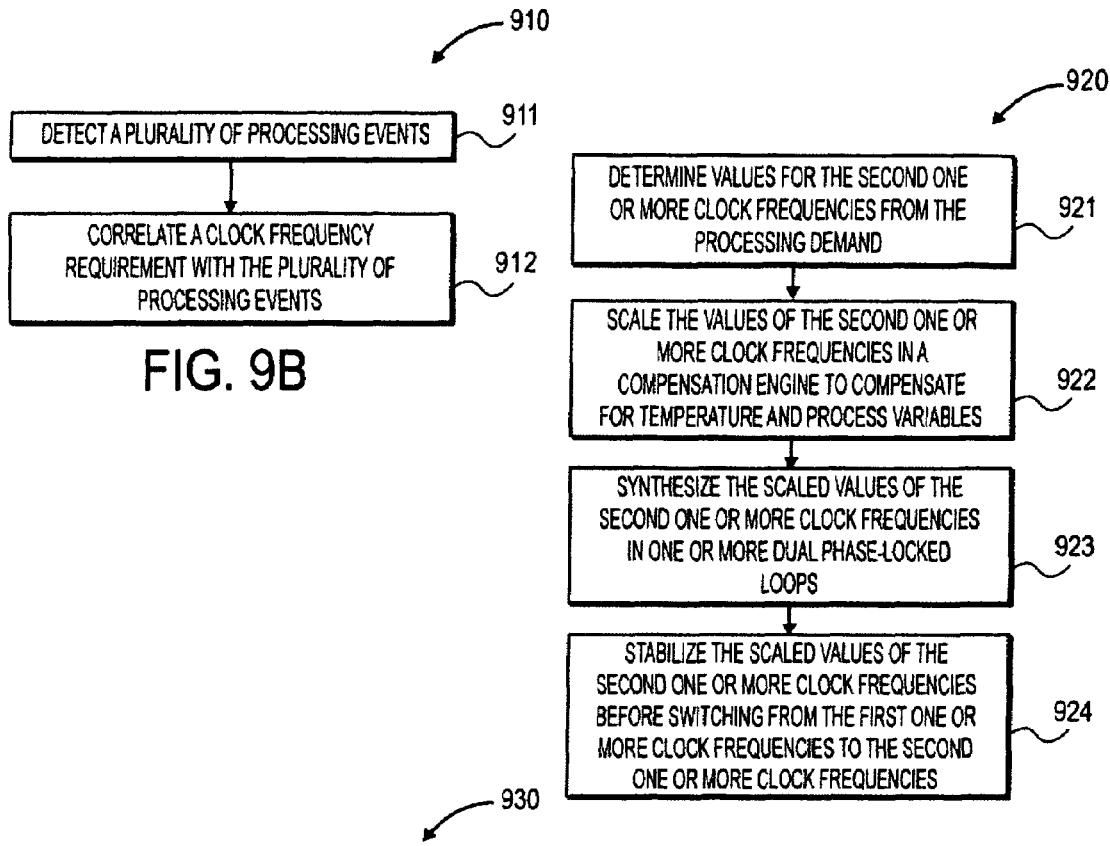
FIG. 9B
FIG. 9C
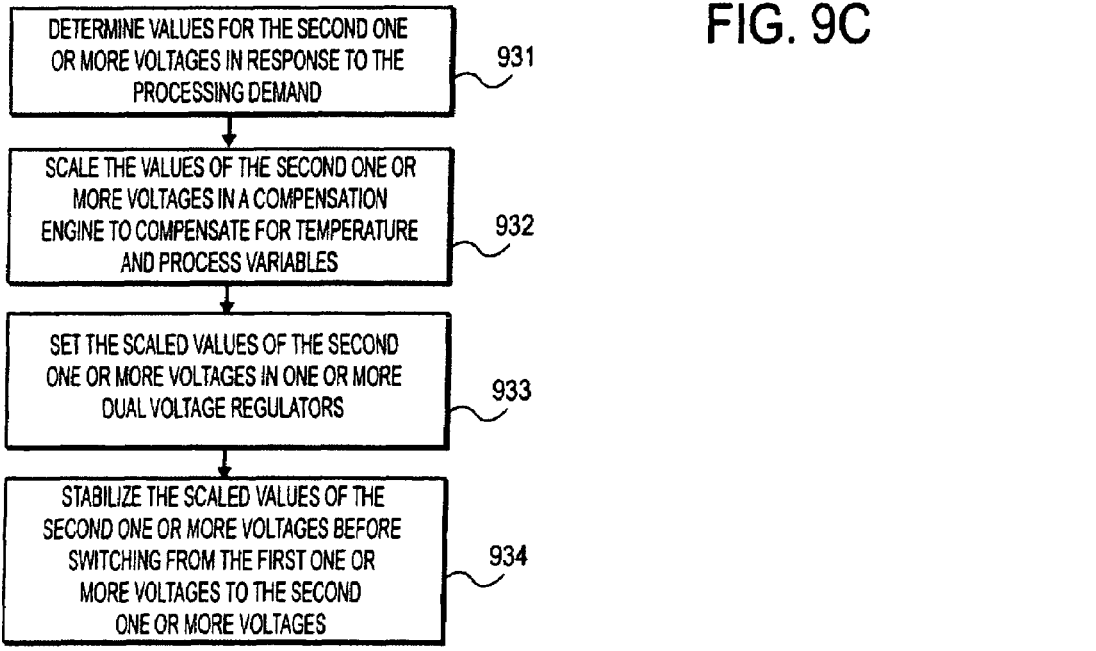
FIG. 9D

METHOD AND APPARATUS FOR ON-DEMAND POWER MANAGEMENT

RELATED APPLICATION

This is a divisional application of application Ser. No. 11/019,804, filed Dec. 21, 2004, now U.S. Pat. No. 7,337,335 which is hereby incorporated by reference.

TECHNICAL FIELD

The present invention relates generally to power management and in particular to managing voltages and frequencies in response to application processing demands.

BACKGROUND

As digital electronic processing systems trend toward higher operating frequencies and smaller device geometries, power management has become increasingly important to prevent thermal overload while maintaining system performance and prolonging battery life in portable systems.

The two principal sources of power dissipation in digital logic circuits are static power dissipation and dynamic power dissipation. Static power dissipation is dependent on temperature, device technology and processing variables, and is composed primarily of leakage currents. Dynamic power dissipation is the predominant loss factor in digital circuitry and is proportional to the operating clock frequency, the square of the operating voltage and the capacitive load. Capacitive load is highly dependent on device technology and processing variables, so most approaches to dynamic power management focus on frequency and voltage control.

One conventional approach to power management halts the processing system to adjust core clock frequencies and voltages, during which time the processor does not execute operating system code or application code, and then restarts the system after the new frequencies and voltages have stabilized. Such an approach is described in U.S. Pat. No. 6,754,837, as illustrated in FIG. 1. FIG. 1 illustrates a processor or processing system 1 contains a programmable voltage ID (VID) register 3, a clock frequency control register 4 and a count register 5. When the processor determines that a change in the voltage and/or frequency is desired, the desired voltage and frequency control information is loaded into the VID register and the clock frequency control register, respectively. Access to those registers triggers a stop request 9 to the CPU core logic 11. In response to the stop request, the CPU completes the current instruction and issues a stop grant signal 13 to indicate to a power controller 7 that processing has stopped. The stop grant state is maintained, for a time determined by a value in the count register, while the voltage and/or frequency are changed and stabilized. In addition to the processing time lost during the stop grant state, this approach may also result in large transient power surges when the processor restarts.

Another conventional approach to power management, described in U.S. Pat. No. 6,788,156, changes the clock frequency of a processor while the processor is operating, but requires the frequency changes to be made in small increments to avoid processing errors that large frequency steps would cause. As a result, this approach may require a significant time period to achieve a desired operating frequency.

Yet another conventional approach to power management, described in U.S. Pat. No. 6,778,418, employs a fixed relationship between voltage and frequency, either through a lookup table or by use of a frequency to voltage converter. In this approach, a frequency increase is always preceded by a voltage increase and a frequency decrease always precedes a voltage decrease. In addition, a frequency increase is delayed while the voltage is ramped up to a corresponding voltage. The new frequency and voltage are not scaled independently, and the new operating point may not be optimum with respect to an application's processing demand.

BRIEF DESCRIPTION OF THE DRAWINGS

The present invention is illustrated by way of example, and not of limitation, in the figures of the accompanying drawings in which:

FIG. 9B illustrates one embodiment of the method illustrated by FIG. 9A;

FIG. 9C illustrates a further embodiment of the method illustrated by FIG. 9A; and FIG. 9D illustrates another further embodiment of the method illustrated by FIG. 9A.

DETAILED DESCRIPTION

Figure 1:
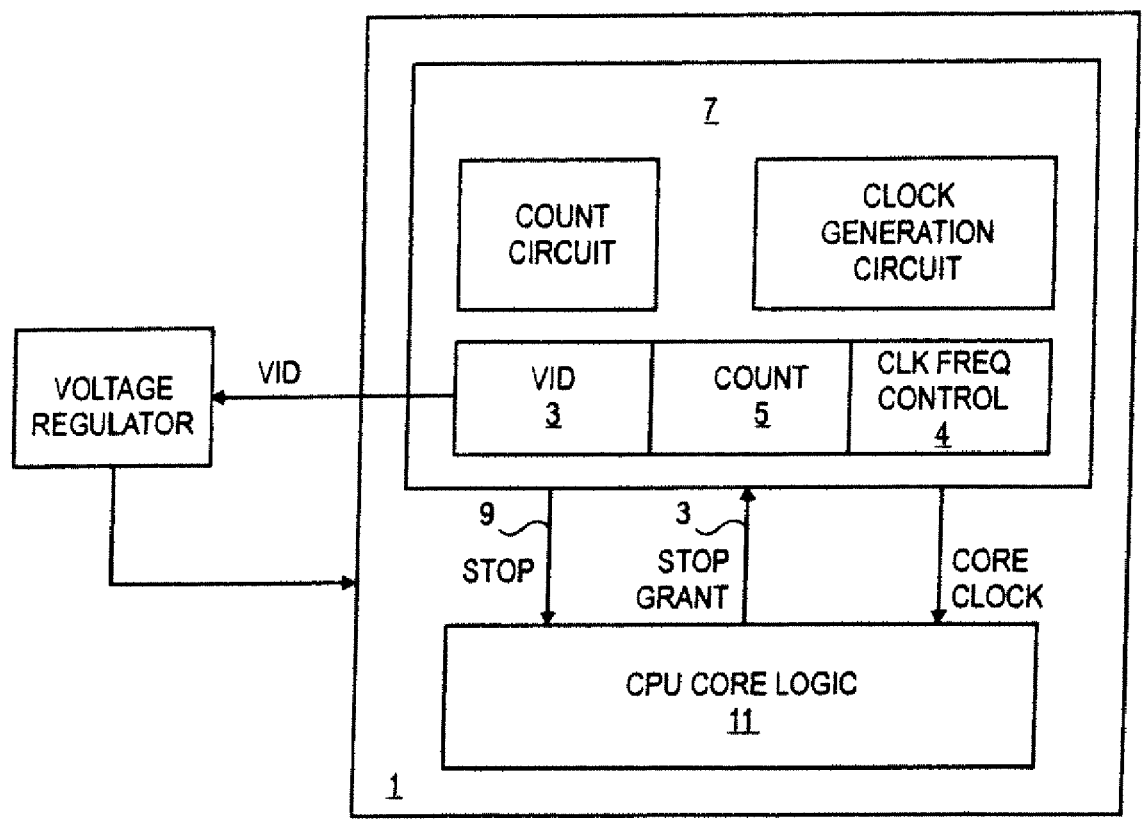
FIG. 1 illustrates a conventional power management system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. It should be noted that the "line" or "lines" discussed herein, that connect elements, may be single lines or multiple lines. The term "coupled" as used herein, may mean directly coupled or indirectly coupled through one or more intervening components. It will also be understood by one having ordinary skill in the art that lines and/or other coupling elements may be identified by the nature of the signals they carry (e.g., a "clock line" may implicitly carry a "clock signal") and that input and output ports may be identified by the nature of the signals they receive or transmit (e.g., "clock input" may implicitly receive a "clock signal").

A method and apparatus for on-demand power management is described. In one embodiment, the method includes monitoring a processing demand in a processing system operating at a first one or more voltages and a first one or more clock frequencies phase-locked to a reference frequency. The method also includes generating a second one or more clock frequencies in response to the processing demand, wherein the second one or more clock frequencies is phase-locked to the reference frequency and phase-matched to the first one or more clock frequencies. The method also includes switching from the first one or more clock frequencies to the second one or more clock frequencies without halting the processing system. In one embodiment, the method further includes generating a second one or more voltages in response to the processing demand, and switching from the first one or more voltages to the second one or more voltages without halting the processing system.

In one embodiment, the apparatus includes a system controller to monitor an application processing demand on a processing system and to determine one or more clock frequencies and one or more voltages at which the processing system operates. The apparatus also includes a power distribution manger, coupled with the system controller, to provide one or more operating voltages to the processing system and to switch between a first one or more voltages and a second one or more voltages without halting the processing system. The apparatus also includes a clock domain manager, coupled with the system controller, to provide one or more clock signals to the processing system and to switch between a first one or more clock frequencies and a second one or more clock frequencies without halting the processing system. The first one or more clock frequencies and the second one or more clock frequencies are phase-locked to a common reference frequency and the second one or more clock frequencies are phase-matched to the first one or more clock frequencies. In one embodiment, the apparatus also includes a compensation engine coupled with the system controller, the power distribution manager and the clock domain manager, to receive voltage and frequency commands from the system controller and to compensate the voltage and frequency commands for temperature and processing variables.

Figure 2A:
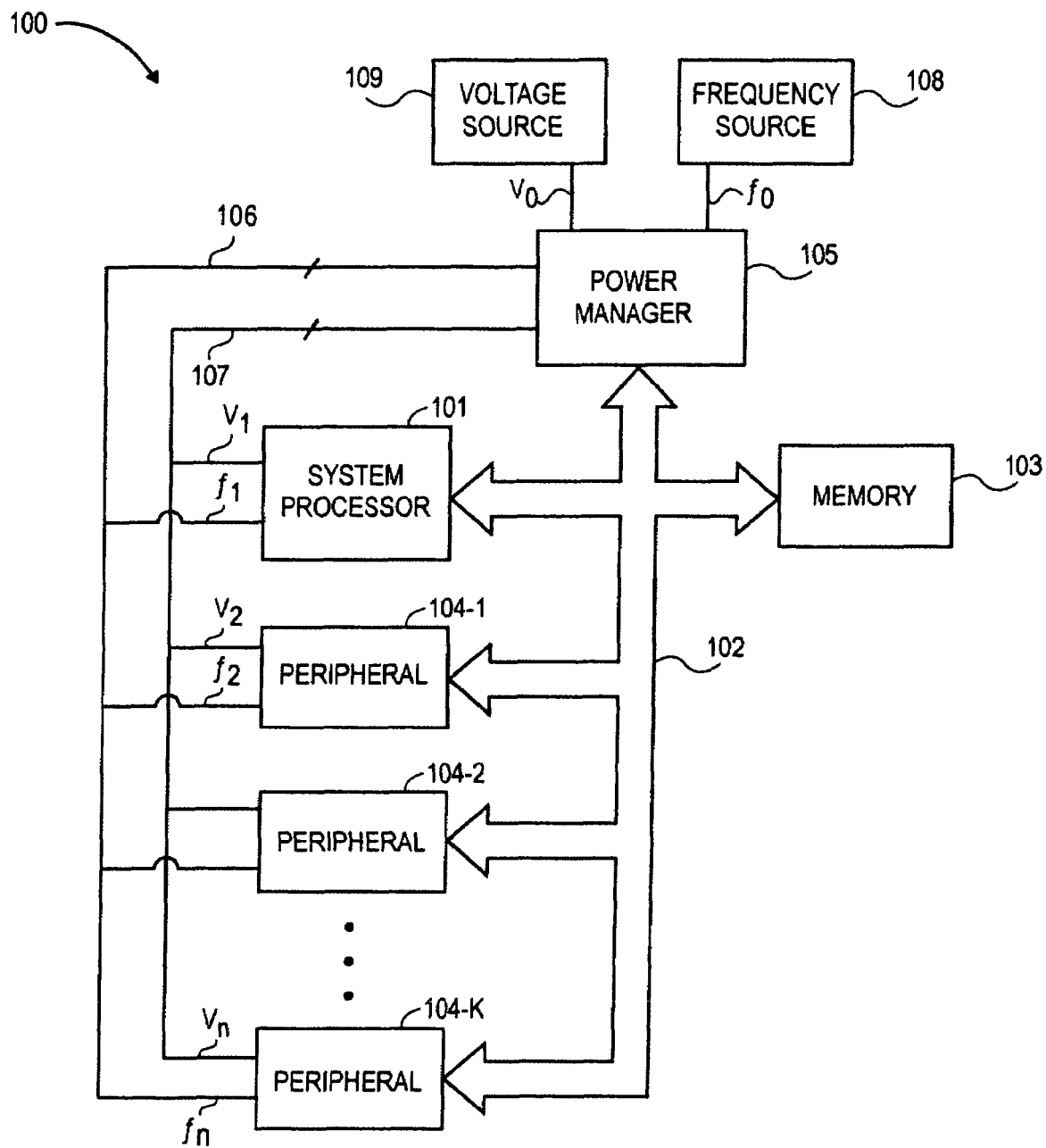
FIG. 2A illustrates one embodiment of on-demand power management in a processing system.

FIG. 2A illustrates one embodiment of on-demand power management in a processing system 100. Processing system 100 may include a system processor 101, which may be a general-purpose processing device such as a microprocessor or central processing unit, or the like. Alternatively, system processor 101 may also be a special-purpose processing device such as an application specific integrated circuit (ASIC), a field programmable gate array (FPGA), a digital signal processor (DSP) or the like. System processor 101 may also be any combination of a general-purpose processing device and a special-purpose processing device. System processor 101 may be coupled to a system bus 102 which may carry system data and commands to and from system processor 101. System bus 102 may be coupled to memory 103 which may store programs and data. Memory 103 may be any type of memory, including, but not limited to, random access memory (RAM) and read only memory (ROM). System bus 102 may also be coupled with peripherals 104-1 through 104-k to carry system commands and data to and from peripherals 104-1 through 104-k.

Processing system 100 may also include power manager 105, which may be coupled to system bus 102, frequency source 108 and voltage source 109. Power manager 105 may also be coupled to system processor 101 and peripherals 104-1 through 104-k via a clock bus 106 and voltage bus 107. In one embodiment, as illustrated in FIG. 2*a*, power manager 105 may be coupled to an external frequency source 108. Power manager 105 may be capable of converting a reference frequency $f_0$ from frequency source 108 into one or more clock frequencies $f_1$ through $f_m$, phase-locked to reference frequency $f_0$, to provide clock signals to system processor 101 and peripherals 104-1 through 104-k. In other embodiments, frequency source 108 may be integrated with power manager 105 and reside with power manager 105 on a common carrier substrate such as, for example, an integrated circuit (IC) die substrate, a multi-chip module substrate, or the like. Power manager 105 may also be capable of converting a voltage $V_0$ from voltage source 109 into one or more operating voltages $V_1$ through $V_n$ to provide voltages to system processor 101 and peripherals 104-1 through 104-k. In the embodiment illustrated in FIG. 2*a*, each of system processor 101 and peripherals 104-1 through 104-k are shown to have one voltage input and one clock input such that m=n=k+1. It will be appreciated that in other embodiments, any of system processor 101 and peripherals 104-1 through 104-k may require more than one operating voltage and/or more than one clock signal. In one embodiment, two or more of system processor 101, memory 103, power manager 105, frequency source 108 and peripherals 104-1 through 104-k may reside on a common carrier substrate, for example, a printed circuit board (PCB) such as motherboard 110 illustrated in FIG. 2B, a daughter board 111 in FIG. 2B, or a line card. Alternatively, the common carrier substrate on which the two or more of system processor 101, memory 103, power manager 105, frequency source 108 and peripherals 104-1 through 104-k may reside can be an integrated circuit (IC) die substrate.

Figure 2B:
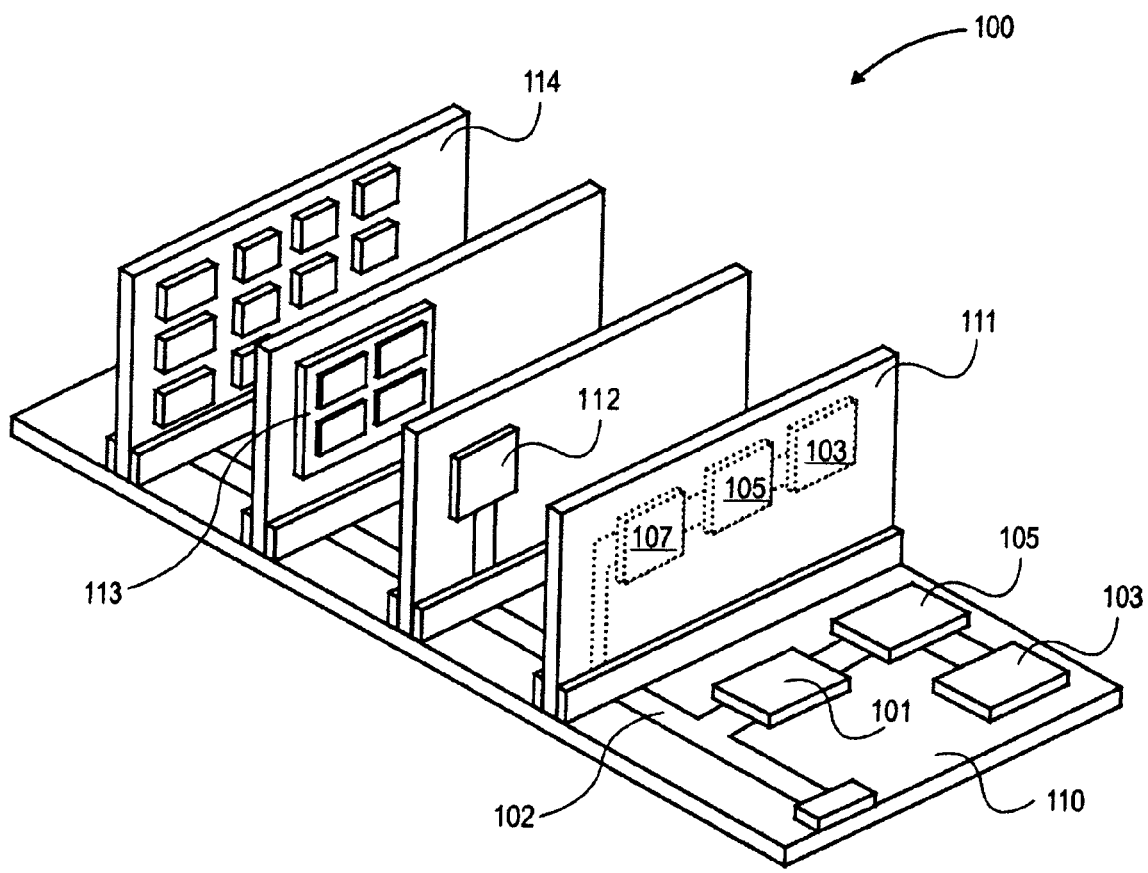
FIG. 2B illustrates one embodiment of on-demand power management in a distributed processing system.

With reference to FIG. 2B, peripherals 104-1 through 104-k may be any type of device, component, circuit, subsystem or system capable of communicating with system processor 101 via system bus 102. For example, any of peripheral devices 104-1 through 104-k may be a single chip device 112 such as a system on a chip, an ASIC, an FPGA, a memory chip or like device. Any of peripherals 104-1 through 104-k may also be a multi-chip module 113 including any combination of single chip devices on a common integrated circuit substrate. Alternatively, peripherals 104-1 through 104-k may reside on one or more printed circuit boards such as, for example, a mother board 110, a daughter board 114 or other type of circuit card.

Figure 2C:
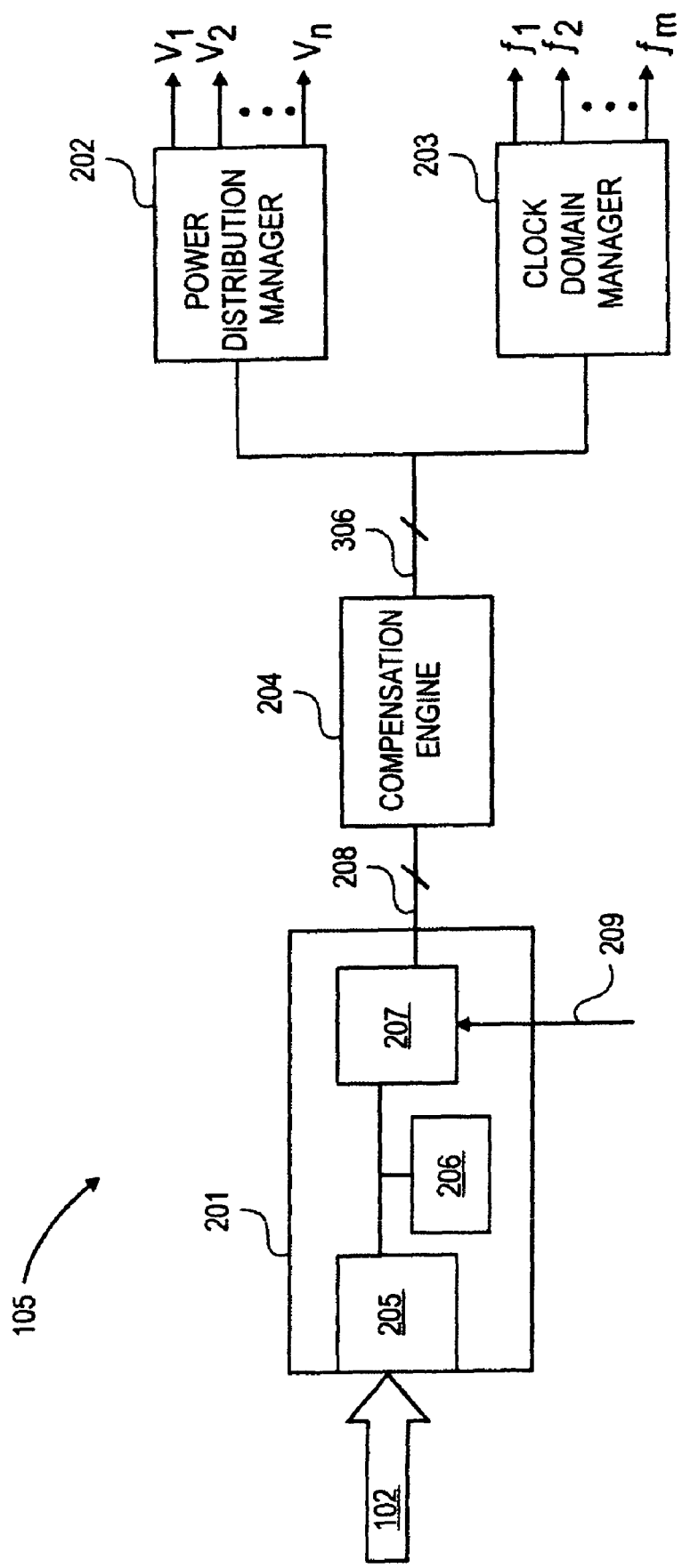
FIG. 2C illustrates one embodiment of an on-demand power manager.

FIG. 2C illustrates a power manager 105 in one embodiment of on-demand power management. Power manager 105 may include a system controller 201 to monitor the application processing demand in processing system 100 and to select an operating point for processing system 100. Power manager 105 may also include a power distribution manager 202, coupled with the system controller 201, to provide the one or more operating voltages $V_1$-$V_n$ to processing system 100 and to switch between a first one or more voltages $V_1'$-$V_n'$ and a second one or more voltages $V_1''$-$V_n''$ without halting processing system 100 as described below. Power manager 105 may also include a clock domain manager 203, coupled with system controller 201, to provide one or more clock signals $f_1$-$f_m$ to processing system 100 and to switch between a first one or more clock signals $f_1'$-$f_m'$ and a second one or more clock signals $f_1''$-$f_m''$ without halting processing system 100 as described below. In one embodiment, power manager 105 may also include a compensation engine 204 coupled with system controller 201, power distribution manager 202 and clock domain manager 203. Compensation engine 204 may be configured to compensate the operating point selected by system controller 201 for temperature and process variables as described in detail below.

In one embodiment, power manager 105 may be configured to monitor processing activity on system bus 102 while supplying the first one or more clock frequencies $f_1'$-$f_m'$ and the first one or more voltages $V_1'$-$V_n'$ to system processor 101 and peripherals 104-1 through 104-k. Power manager 105 may also be configured to determine a processing demand based on the monitored processing activity and to generate the second one or more clock frequencies $f_1''$-$f_m''$ and the second one or more voltages $V_1''$-$V_n''$ in response to the processing demand. Power manager 105 may also be configured to switch from the first one or more voltages to the second one or more voltages without halting the processing system 100, and to switch from the first one or more clock frequencies to the second one or more clock frequencies without halting the processing system 100.

System controller 201 may include a bus interface unit 205 to monitor processing activity on system bus 102 and to select a new operating point for the processing system 100. System controller 201 may also include a programmable memory 206 coupled with the bus interface unit 205. Programmable memory 206 may include programmed information to enable the bus interface unit 205 to correlate activity on the system bus 102 with the application processing demand in processing system 100.

In one embodiment, bus interface unit 205 may be configured to detect a plurality of commands on the system bus 102 and to recognize a command pattern, programmed in programmable memory 206, associated with a change in the application processing demand. The command pattern may be a generic processing command pattern, or a command pattern and bus transaction cycles associated with a specific system processor 101 or a processor family of which system processor 101 may be a member. In response to recognizing the command pattern, bus interface unit 205 may select the new operating point for the processing system 100. The new operating point may include a new set of operating voltages $V_1''$-$V_n''$ which are different from a current set of operating voltages $V_1'$-$V_n'$, and/or a new set of clock frequencies $f_1''$-$f_m''$ which are different from a current set of operating clock frequencies $f_1'$-$f_m'$. In one embodiment, the current sets of operating voltages and clock frequencies and the new sets of operating voltages and clock frequencies may be written to hardware registers (not shown) within system controller 201 or software defined registers (e.g., memory locations in programmable memory 206).

Alternatively, bus interface unit 205 may be configured to detect an average number of processing events per unit time on system bus 102 and to compare the average number of processing events with one or more current clock frequencies 112. Based on the comparison, bus interface unit 205 may select a new operating point as described above.

As described in greater detail below, system controller 201 may also include a state machine 207, coupled with the bus interface unit 206 and a command bus 208, to control the provision of voltages $V_1$-$V_n$ in the power distribution manager 202 and the provision of clock frequencies $f_1$-$f_m$ in the clock domain manager 203.

It will be appreciated by one having ordinary skill in the art that system controller 201 may be configured to automatically monitor the processing activity on system bus 102 and to and autonomously command the one or more voltages $V_1$-$V_n$ and the one or more clock frequencies $f_1$-$f_m$ to select a new operating point as the application processing demand in processing system 100 changes. However, system controller 201 may also include a command interrupt line 209, coupled with state machine 207, to override the automatic control of the one or more voltages $V_1$-$V_n$ and the one or more clock frequencies $f_1$-$f_m$ (e.g., in response to a critical power demand from the system processor 101 or one or more of peripherals 104-1 through 104-n). Command interrupt line 209 may be used to set processing system 100 to a predetermined operating point wherein the system controller 201 commands the power distribution manager 202 to provide one or more predetermined voltages to the processing system 100 and wherein the system controller commands the clock domain manager to provide one or more predetermined clock frequencies to the processing system 100.

Figure 3:
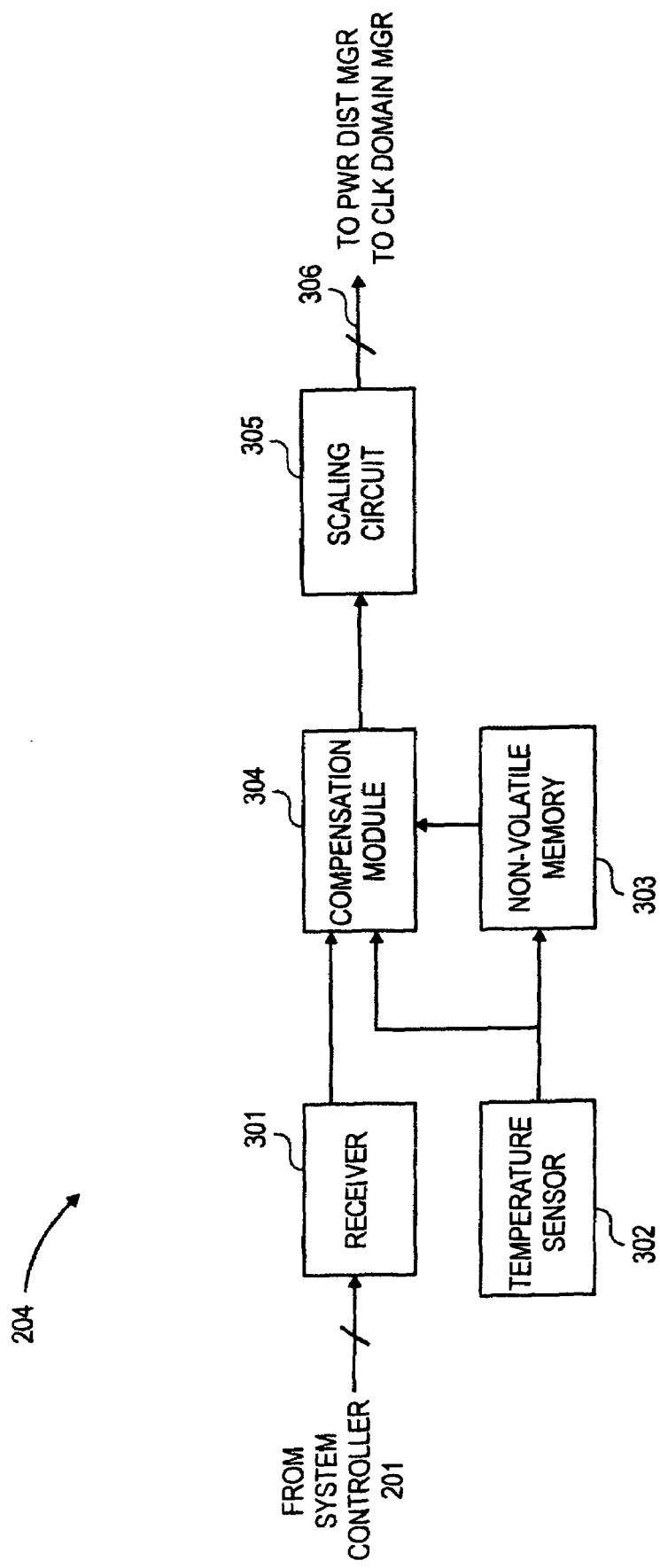
FIG. 3 illustrates a compensation engine in one embodiment of on-demand power management.

FIG. 3 illustrates a compensation engine 204 in one embodiment of on-demand power management. Compensation engine 204 may include a receiver 301 to receive one or more voltage commands and one or more frequency commands from system controller 201 which are selected by system controller 201 to change the operating point of system 100 in response to the application processing demand. The voltage and frequency commands received by receiver 301 may be digital commands. Compensation engine 204 may also include a temperature sensor 302 to measure and report a temperature which may be, for example, a device temperature, a system temperature, an ambient temperature or any temperature which may have an effect on the operating point of processing system 100. Compensation engine 204 may also include a non-volatile memory 303, coupled with temperature sensor 302, to store calibration data for processing system 100. The calibration data stored in non-volatile memory 303 may contain temperature dependent voltage and frequency correction factors for a device or system processing technology (e.g., CMOS processes) or one or more individual devices such as system processor 101 and peripherals 104-1 through 104-k. Compensation engine 204 may also include a compensation module 304 which may be coupled with receiver 301, temperature sensor 302 and non-volatile memory 303. Compensation module 304 may be configured to compensate voltage and frequency commands from receiver 301 for temperature, and temperature dependent processing and device variables. Compensation module 304 may be coupled with a scaling circuit 305 to provide one or more scaled voltage commands to the power distribution manager 202 and one or more scaled frequency commands to the clock domain manager 203 via command bus 306.

Figure 4:
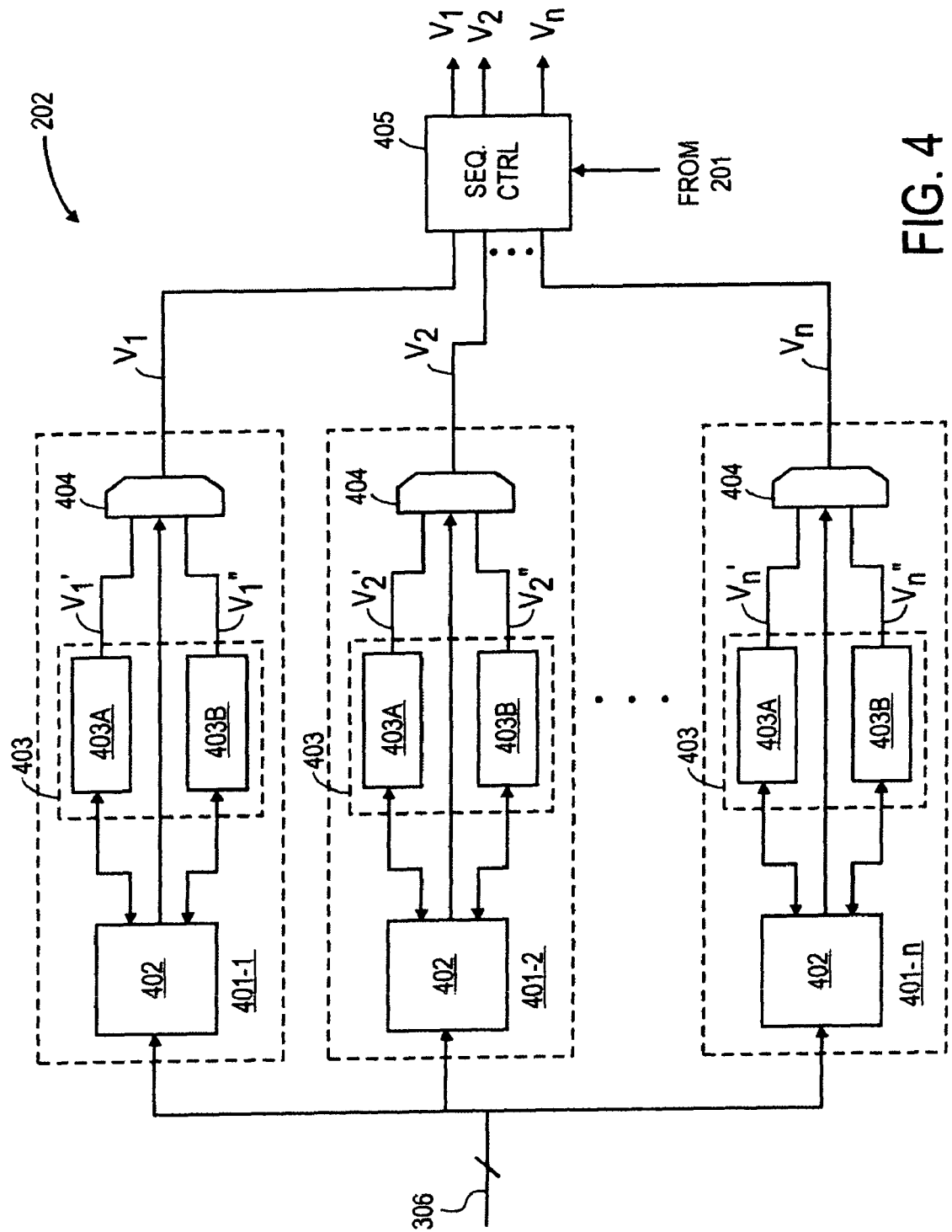
FIG. 4 illustrates a power distribution manager in one embodiment of on-demand power management.

FIG. 4 illustrates a power distribution manager 202 in one embodiment of on-demand power management. Power distribution manager 202 may include one or more voltage control channels 401-1 through 401-n corresponding to one or more operating voltages $V_1$-$V_n$. Each voltage control channel 401-1 through 401-n may include a dual voltage regulator 403 coupled between a ping-pong controller 402 and a multiplexer 404. The ping-pong controller may receive commands from the state machine 207 in system controller 201, through compensation engine 204, via command bus 306. The ping-pong controller 402 may set a first voltage regulator 403a to a first voltage, a second voltage regulator 403b to a second voltage, and select between the first voltage and the second voltage in response to voltage commands from state machine 207. For example, in voltage control channel 401-1, voltage regulator 403a may be set to a first voltage $V_1'$ and voltage regulator 403b may be set to a second voltage $V_1''$. Power distribution manager 202 may also include a sequence controller 405, controlled by the system controller 201, to sequence the transitions between the first one or more voltages $V_1'$-$V_n'$ and a second one or more voltages $V_1''$-$V_n''$ in order to manage transient power demands. It will be appreciated that because the voltage changes described above may be made independently of any frequency changes, the voltages may be switched without halting the processing system 100.

Figure 5:
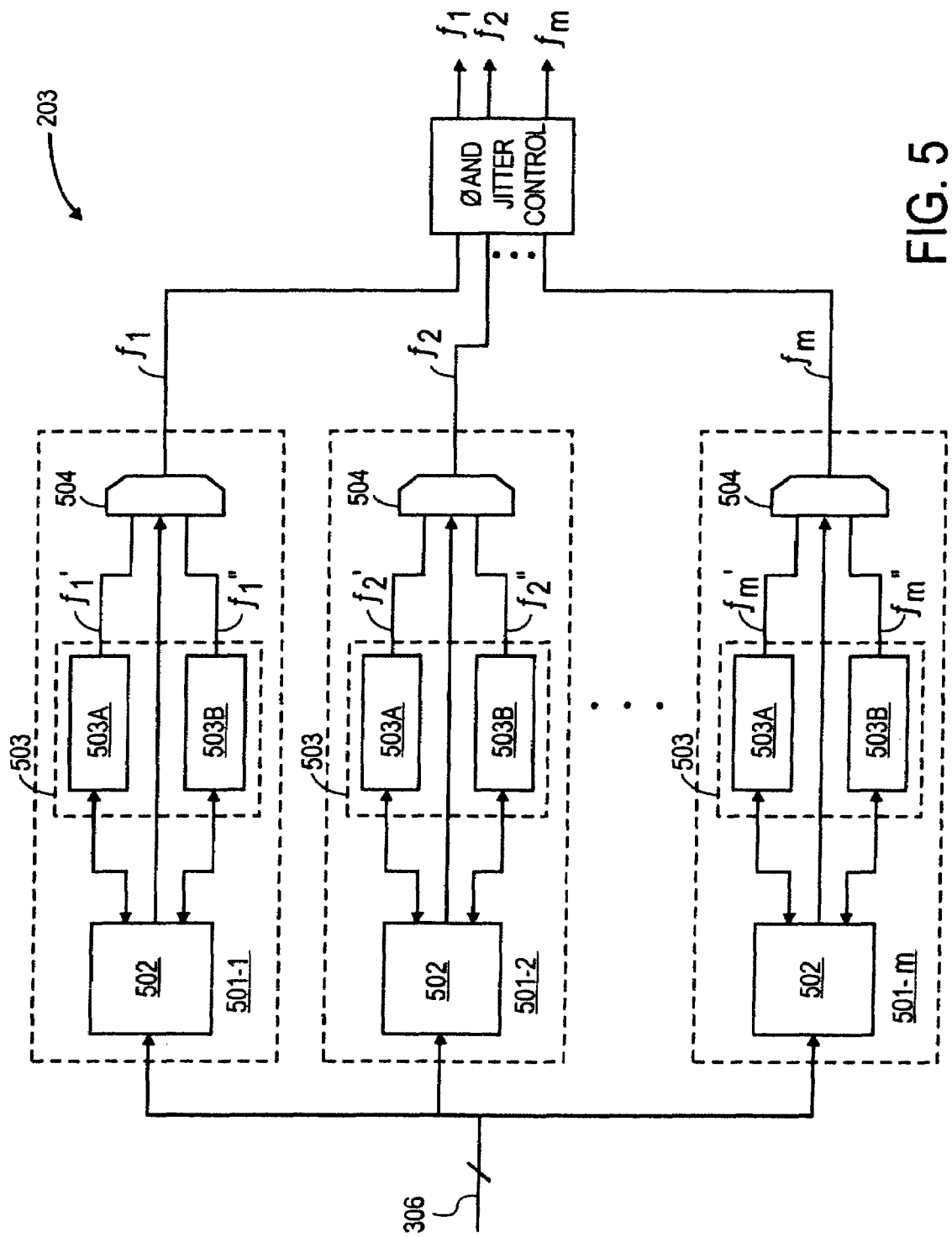
FIG. 5 illustrates a clock domain manager in one embodiment of on-demand power management.

FIG. 5 illustrates a clock domain manager 203 in one embodiment of on-demand power management. Clock domain manager 203 may include one or more frequency control channels 501-1 through 501-m corresponding to one or more clock signals f1-fm. Each frequency control channel 501-1 through 501-m may include a dual phase-locked loop (PLL) 503 coupled between a ping-pong controller 502 and a multiplexer 504. The ping-pong controller may receive commands from the state machine 207 in system controller 201, through compensation engine 204, via command bus 306. The ping-pong controller 502 may set a first PLL 503a to a first clock frequency, a second PLL 503b to a second clock frequency, and select between the first clock frequency and the second clock frequency in response to frequency commands from state machine 207. For example, in frequency control channel 501-1, PLL 503a may be set to a first clock frequency $f_1'$ and PLL 503b may be set to a second clock frequency $f_1''$. Each PLL 503a and 503b may be phase-locked to the reference frequency 110 from frequency source 108 (not shown), such that the clock frequencies provide by PLL's 503a and 503b are all multiples or sub-multiples of the reference frequency 110. Frequency multiplying PLL's and frequency dividing PLL's are known in the art and will not be discussed in detail here. Clock domain manger 203 may also include a jitter and phase controller 505, controlled by the system controller 201, to adjust for differential propagation delays among clock frequencies $f_1$-$f_m$ and to control the combined spectral content of the clock frequencies $f_1$-$f_m$.

Figure 6:
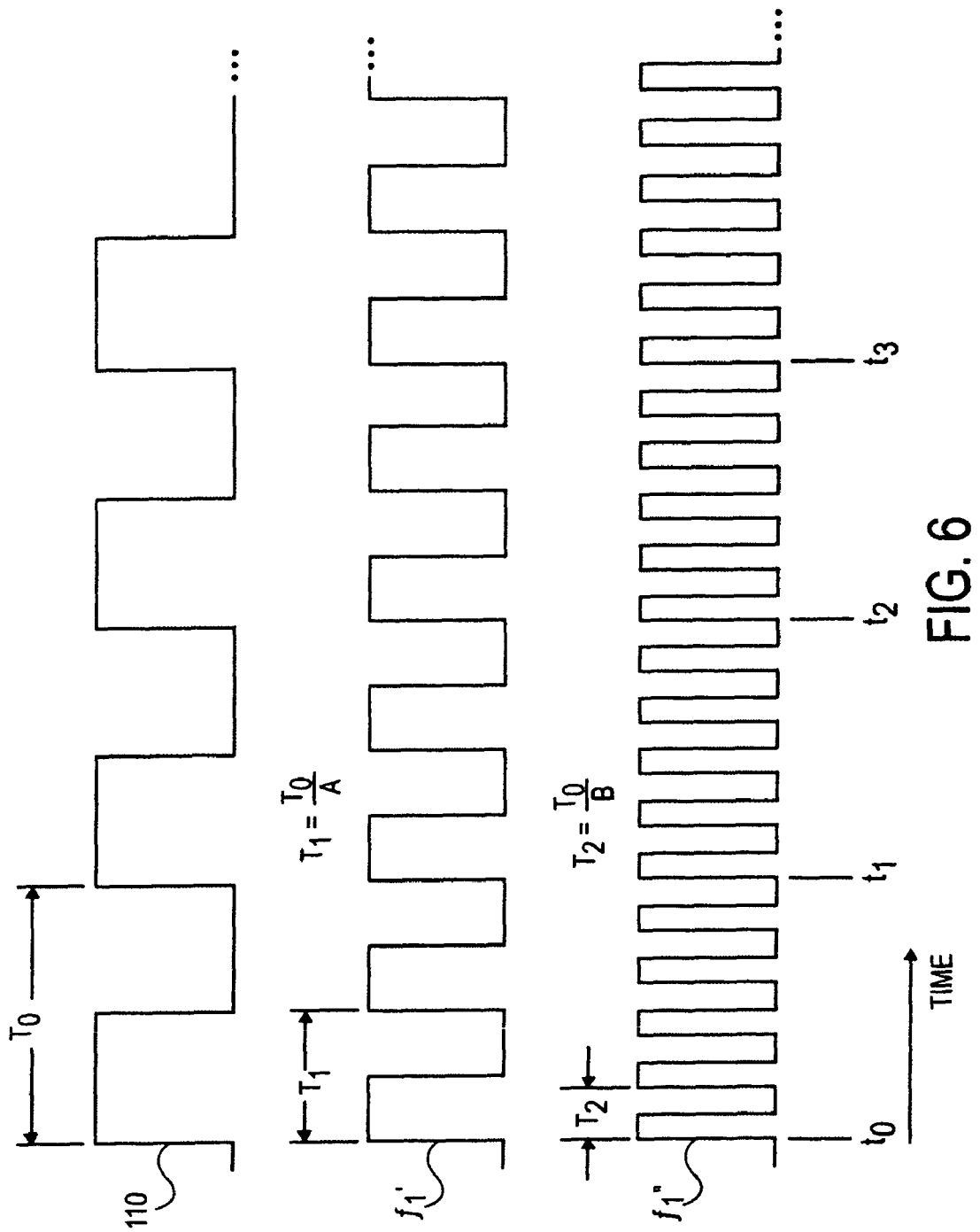
FIG. 6 illustrates one embodiment of phase-matching in on-demand power management.

It will be appreciated by one of ordinary skill in the art that all clock frequencies f1-fm will be harmonically related because all are phase-locked to the common reference frequency 110. In particular, any two clock frequencies in a single frequency control channel (e.g., clock frequencies $f_1'$ and $f_1''$ in frequency control channel 501-1) will be harmonically related. FIG. 6 illustrates how this harmonic relationship may be used to switch between a first clock frequency and a second clock frequency without halting the processing system 100. FIG. 6 depicts reference frequency 110 having frequency $f_0$ and period $T_0$ a=1/$f_0$, clock frequency $f_1'$=A$f_0$ and period $T_1$=$T_0$/A, and frequency $f_1''$=B$f_0$ and period $T_2$=$T_0$/B. As shown in FIG. 6, the phase of clock frequency $f_1'$ will periodically align with the phase of clock frequency f1" (e.g., at times $t_1$, $t_2$, $t_3$, etc.) at time intervals corresponding to the lowest common multiples of $T_1$ and $T_2$. This time interval may be calculated, for example, by system controller 201. Therefore, when a new operating point is commanded by the system controller in response to an application processing demand, the switch from the first clock frequency (e.g., $f_1'$) to the second clock frequency (e.g., $f_1''$) may be timed to occur when the phases of the first clock frequency and the second clock frequency are aligned. If the phases of the first clock frequency and the second clock frequency are aligned when the frequencies are switched (e.g., by a multiplexer 504), there is no phase discontinuity in the processing system 100 and the frequencies may be switched without halting the processing system 100. The ratio of the second clock frequency to the first clock frequency may be very large, approximately up to six orders of magnitude depending on the stability of the reference frequency 109.

Figure 7:
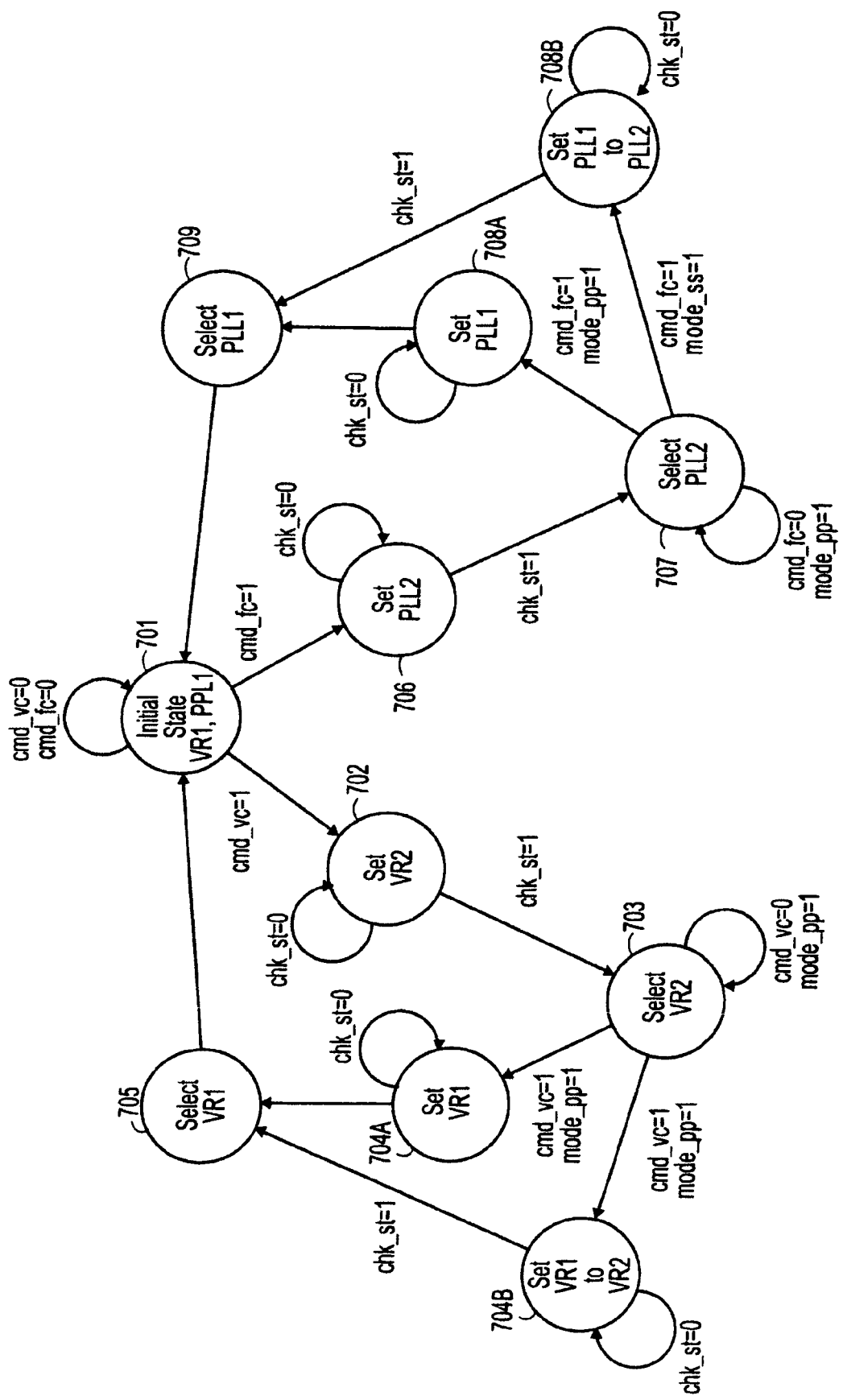
FIG. 7 is a state diagram illustrating one embodiment of on-demand power management.
Figure 8:
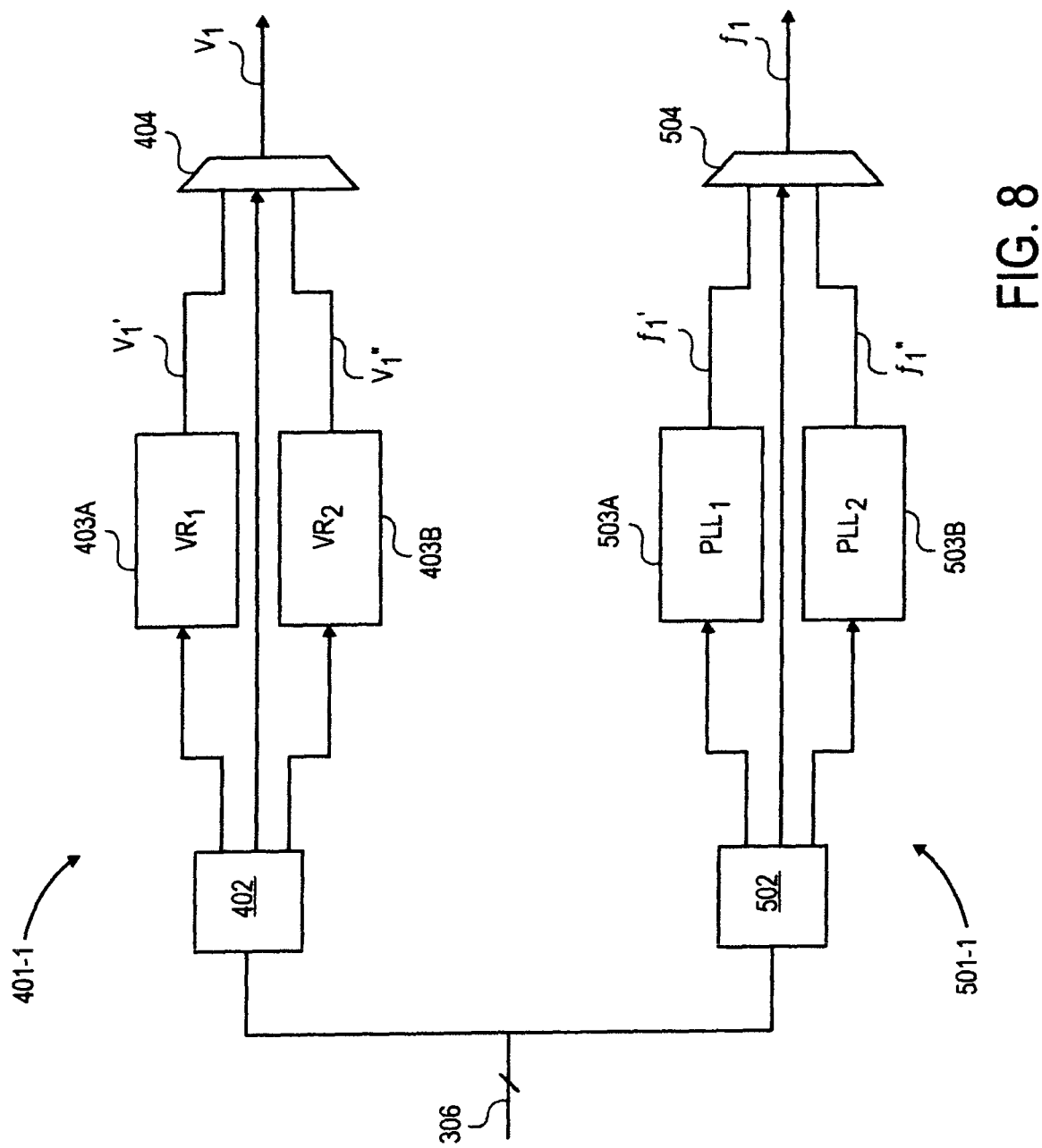
FIG. 8 illustrates voltage and frequency control in one embodiment of on-demand power management.

As noted above, the ping-pong controllers 402 in the power distribution manager 202 may receive commands from state machine 207 in system controller 201 to control the dual voltage regulators 403, and the ping-pong controllers 502 in the clock domain manger 203 may receive commands from the state machine 207 in the system controller 201 to control the dual PLL's 503. FIG. 7 illustrates a state diagram for state machine 207 in one embodiment of on-demand power management for the exemplary voltage control channel 401-1 (where the dual voltage regulators 403a and 403b are designated as $VR_1$ and $VR_2$, respectively) and the exemplary frequency control channel 501-1 (where the dual PLL's 503a and 503b are designated as $PLL_1$ and $PLL_2$, respectively), as shown in FIG. 8. It will be appreciated that a state diagram, such as the state diagram in FIG. 7 may be applied to each voltage control channel in power distribution manager 202 and each frequency control channel in clock domain manager 203.

In one embodiment, when a new operating voltage and/or a new clock frequency is commanded by the system controller, state machine 207 may operate in a ping-pong mode or a steady-state mode. Ping-pong mode is a symmetric mode where a new steady-state operating voltage is provided alternately by $VR_1$ and $VR_2$ with each change, and where the new steady-state clock frequency is provided alternately by $PLL_1$ and $PLL_2$ with each change. Steady-state mode is an asymmetrical mode where a new steady-state voltage is always provided by one voltage regulator (e.g., $VR_1$) after a transient change is provided by the other voltage regulator (e.g., $VR_2$) and where a new steady-state clock frequency is always provided by one PLL (e.g., $PLL_1$) after a transient change is provided by the other PLL (e.g., $PLL_2$). Table 1 defines the state variables used in FIG. 7 and in the following description.

TABLE 1

| State Variable Name | Function | Set (value = 1) | Cleared (value = 0) |
|---|---|---|---|
| cmd_fc | frequency change command | change frequency | do not change frequency |
| cmd_vc | voltage change command | change voltage | do not change voltage |
| chk_st | check stability | stable | not stable |
| mode_pp | ping-pong mode | ping-pong mode on | ping-pong mode off |
| mode_ss | steady-state mode | steady-state mode on | steady-state mode off |

In an initial state (701), $VR_1$ is set to a first voltage, which is selected by multiplexer 404 and provided to processing system 100. In the initial state $PLL_1$ is set to a first clock frequency, which is selected by multiplexer 504 and provided to processing system 100. Bus interface unit 205 periodically checks the system bus 102 for processing activity. If bus interface unit 205 does not detect a change in processing activity, the change frequency flag is cleared (cmd_fc=0) and the change voltage flag is cleared (cmd_vc=0). If bus interface unit 205 detects a change in processing activity on system bus 102 that warrants a change in the operating point of processing system 100, bus interface unit 205 will select the new operating point from programmable memory 206, which may require a new voltage and/or new clock frequency.

If a new voltage is required (cmd_vc=1), $VR_2$ is commanded to the new voltage (702). After the new voltage is stabilized (chk_st=1), the output of $VR_2$ is selected (703). In ping-pong mode (mode_pp=1), $VR_2$ continues to be selected while the voltage requirement does not change (cmd_vc=0). If the voltage requirement changes (cmd_vc=1), $VR_1$ is commanded to the new voltage (704a). After the new voltage is stabilized (chk_st=1), the output of $VR_1$ is selected (705) and the system returns to the initial state with the new voltage. In steady-state mode (mode_ss=1) at 703, the output of $VR_1$ is commanded to equal the output of $VR_2$ (704b) and the output of $VR_1$ is selected (705) when $VR_1$ is stabilized (chk_st=1) and the system returns to the initial state with the new voltage.

If a new clock frequency is required (cmd_fc=1), $PLL_2$ is commanded to the new frequency (706). After the new frequency is stabilized (chk_st=1), the output of $PLL_2$ is selected (707). In ping-pong mode (mode_pp=1), $PLL_2$ continues to be selected while the frequency requirement does not change (cmd_fc=0). If the frequency requirement changes (cmd_fc=1), $PLL_1$ is commanded to the new frequency (708a). After the new frequency is stabilized (chk_st=1), the output of $PLL_1$ is selected (709) and the system returns to the initial state (701) with the new frequency. In steady-state mode (mode_ss=1) at 707, the output of $PLL_1$ is commanded to equal the output of $PLL_2$ (708b) and the output of $PLL_1$ is selected (709) when $PLL_1$ is stabilized (chk_St=1) and the system returns to the initial state (701) with the new frequency.

Figure 9A:
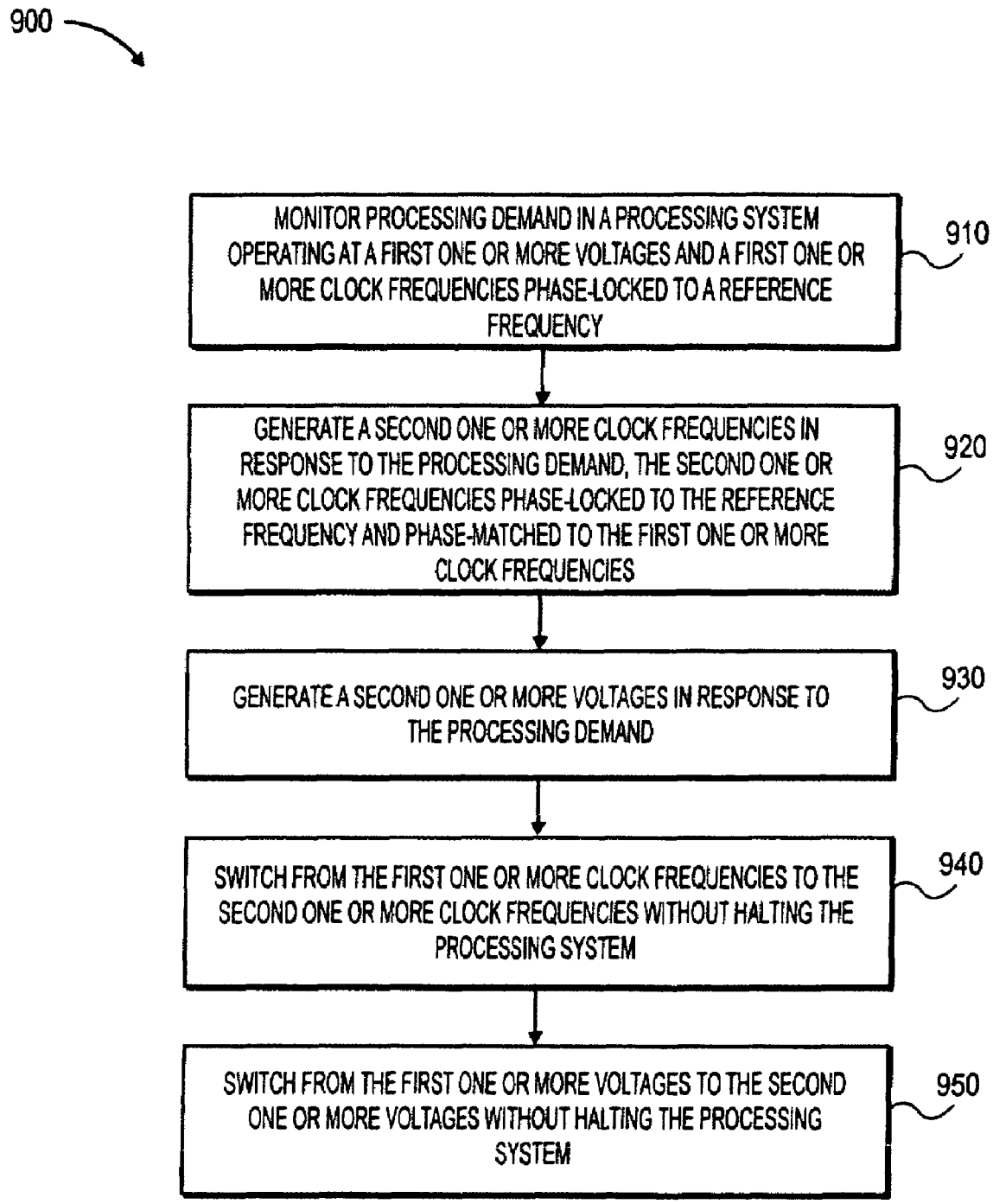
FIG. 9A illustrates a method in one embodiment of on-demand power management.

FIG. 9A illustrates one embodiment of a method 900 for on-demand power management. With reference to FIGS. 1 through 4, the method may include: monitoring a processing demand in processing system 100 operating at a first one or more voltages 113 and a first one or more clock frequencies 112 phase-locked to a reference frequency 110 (step 910); generating a second one or more clock frequencies 112 in response to the processing demand, the second one or more clock frequencies 112 phase-locked to the reference frequency 109 and phase-matched to the first one or more clock frequencies 112 (step 920); generating a second one or more voltages 113 in response to the processing demand (step 930); switching from the first one or more voltages 110 to the second one or more voltages 113 without halting the processing system 100 (step 940); and switching from the first one or more clock frequencies 112 to the second one or more clock frequencies 112 without halting the processing system 100 (step 950).

In one embodiment, as illustrated in FIG. 9B, monitoring the processing demand (step 910) may include: detecting a plurality of processing events on a system bus 102 with a bus interface unit 205 (step 911); and correlating a clock frequency requirement with the plurality of processing events (step 912).

In one embodiment, as illustrated in FIG. 9C, generating the second one or more clock frequencies 111 in response to the processing demand (step 920) may include: determining values for the second one or more clock frequencies 112 from the processing demand (step 921); scaling the values of the second one or more clock frequencies in a compensation engine 204 to compensate for a system temperature and a processing variable (step 922); synthesizing the scaled values of the second one or more clock frequencies 112 in one or more dual phase-locked loops 503 (step 923); and stabilizing the scaled values of the second one or more clock frequencies 112 before switching from the first one or more clock frequencies 112 to the second one or more clock frequencies 112 with one or more multiplexers 504.

In one embodiment, as illustrated in FIG. 9D, generating the second one or more voltages 113 in response to the processing demand (step 930) may include: determining values for the second one or more voltages 113 from the processing demand (step 931); scaling the values of the second one or more voltages 113 in a compensation engine 204 to compensate for a system temperature and a processing variable (step 932); setting the scaled values of the second one or more voltages 113 in one or more dual voltage regulators 403 (step 933); and stabilizing the scaled values of the second one or more voltages 113 before switching from the first one or more voltages 113 to the second one or more voltages 113 with one or more multiplexers 404.

Thus, a method and apparatus for on-demand power management has been described. It will be apparent from the foregoing description that aspects of the present invention may be embodied, at least in part, in software. That is, the techniques may be carried out in a computer system or other data processing system in response to its processor, such as system controller 201, executing sequences of instructions contained in a memory, such as programmable memory 206. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations may be described as being performed by or caused by software code to simplify description. However, those skilled in the art will recognize what is meant by such expressions is that the functions result from execution of the code by a processor or controller, such as system controller 201.

A machine-readable medium can be used to store software and data which when executed by a data processing system causes the system to perform various methods of the present invention. This executable software and data may be stored in various places including, for example, memory 103 and programmable memory 206 or any other device that is capable of storing software programs and/or data.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM); random access memory (RAM); magnetic disk storage media; optical storage media; flash memory devices; etc.); etc.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:
   providing a first plurality of voltages to a processing system;
   generating a second plurality of voltages in response to a change in an application processing demand in the processing system;
   generating one or more control signals to adjust for the change in the application processing demand; and
   in response to the one or more control signals, switching from each of the first plurality of voltages to each of the second plurality of voltages in a sequence without halting the processing system, wherein the sequence minimizes a transient power surge.

2. The method of claim 1, further comprising:
   determining the change in the application processing demand in the processing system.

3. The method of claim 2, wherein determining the change in the application processing demand comprises:
  detecting a plurality of processing events on a system bus;
  recognizing a processing event pattern; and
  correlating the processing event pattern with the application processing demand.

4. The method of claim 1, wherein generating the second plurality of voltages comprises:
  determining values for the second plurality of voltages based on the change in the application processing demand;
  scaling the values of the second plurality of voltages to compensate for at least one of a processing system temperature and a processing variable of the processing system;
  synthesizing the scaled values of the second plurality of voltages; and
  stabilizing the scaled values of the second plurality of voltages before the switching.

5. The method of claim 1, further comprising:
  providing a first plurality of frequencies to the processing system;
  generating a second plurality of frequencies in response to a change in the application processing demand in the processing system;
  generating one or more control signals to adjust for the change in the application processing demand; and
  in response to the one or more control signals, switching from each of the first plurality of frequencies to each of the second plurality of frequencies in a sequence without halting the processing system.

6. The method of claim 5, wherein generating the second plurality of frequencies comprises:
  determining values for the second plurality of frequencies based on the change in the application processing demand;
  scaling the values of the second plurality of frequencies to compensate for at least one of a processing system temperature and a processing variable of the processing system;
  synthesizing the scaled values of the second plurality of frequencies; and
  stabilizing the scaled values of the second plurality of frequencies before the switching.

7. An apparatus, comprising:
  a system controller to monitor a change in an application processing demand in a processing system, the system controller comprising a state machine to generate one or more control signals to adjust for a change in the application processing demand; and
  a power distribution manager coupled to the system controller to provide a first plurality of voltages to the processing system, the power distribution manager including a sequence controller to receive the one or more control signals from the system controller, and to switch from each of the first plurality of voltages to each of a second plurality of voltages in a sequence without halting the processing system, wherein the sequence minimizes a transient power surge.

8. The apparatus of claim 7, wherein the one or more control signals comprise at least one or voltage commands and frequency commands.

9. The apparatus of claim 7, further comprising a compensation engine coupled between the system controller and the power distribution manager, wherein the one or more control signals are received by the power distribution manager through the compensation engine.

10. The apparatus of claim 9, wherein the compensation engine is configured to receive the one or more controls signals from the system controller and provide one or more scaled control signals to the power distribution manager.

11. The apparatus of claim 10, wherein the one or more scaled control signals comprise one or more scaled frequency commands and one or more scaled voltage commands.

12. The apparatus of claim 11, further comprising a clock domain manager coupled to the compensation engine, wherein the compensation engine is configured to provide the one or more scaled voltage commands to the power distribution manager and the one or more scaled frequency commands to the clock domain manager.

13. The apparatus of claim 12, wherein the clock domain manager is configured to receive the one or more scaled frequency commands and to switch from each of a first plurality of frequencies to each of a second plurality of frequencies in a sequence, without halting the processing system.

14. The apparatus of claim 11, wherein the compensation engine comprises:
  a receiver;
  a compensation module coupled to the receiver to receive the one or more control signals from the system controller;
  a sensor coupled to the compensation module; and
  a memory coupled to the compensation module and the sensor, the memory to store calibration data, wherein the compensation module is configured to generate the one or more scaled voltage commands and the one or more scaled frequency commands using the calibration data.

15. The apparatus of claim 14, wherein the sensor is a temperature sensor and the calibration data comprises temperature dependent voltage and frequency correction factors.

16. The apparatus of claim 15, wherein the temperature sensor monitors at least one of a device temperature, a system temperature, an ambient temperature.

17. The apparatus of claim 15, wherein the temperature dependent voltage and frequency correction factors are based on a device of the processing system being supplied the second plurality of voltages.

18. The apparatus of claim 15, wherein the temperature dependent voltage and frequency correction factors are based on a process technology of the device of the processing system.

19. The apparatus of claim 18, wherein the device is a peripheral.

20. The apparatus of claim 18, wherein the device is a processor.

21. A machine readable storage medium having instructions stored thereon that, when executed by a processing system, cause the processing system to perform the method of claim 1.

* * * * *